April 25, 1933. G. L. MATTHIAS 1,905,929
VULCANIZING APPARATUS
Filed Aug. 24, 1928     3 Sheets-Sheet 1
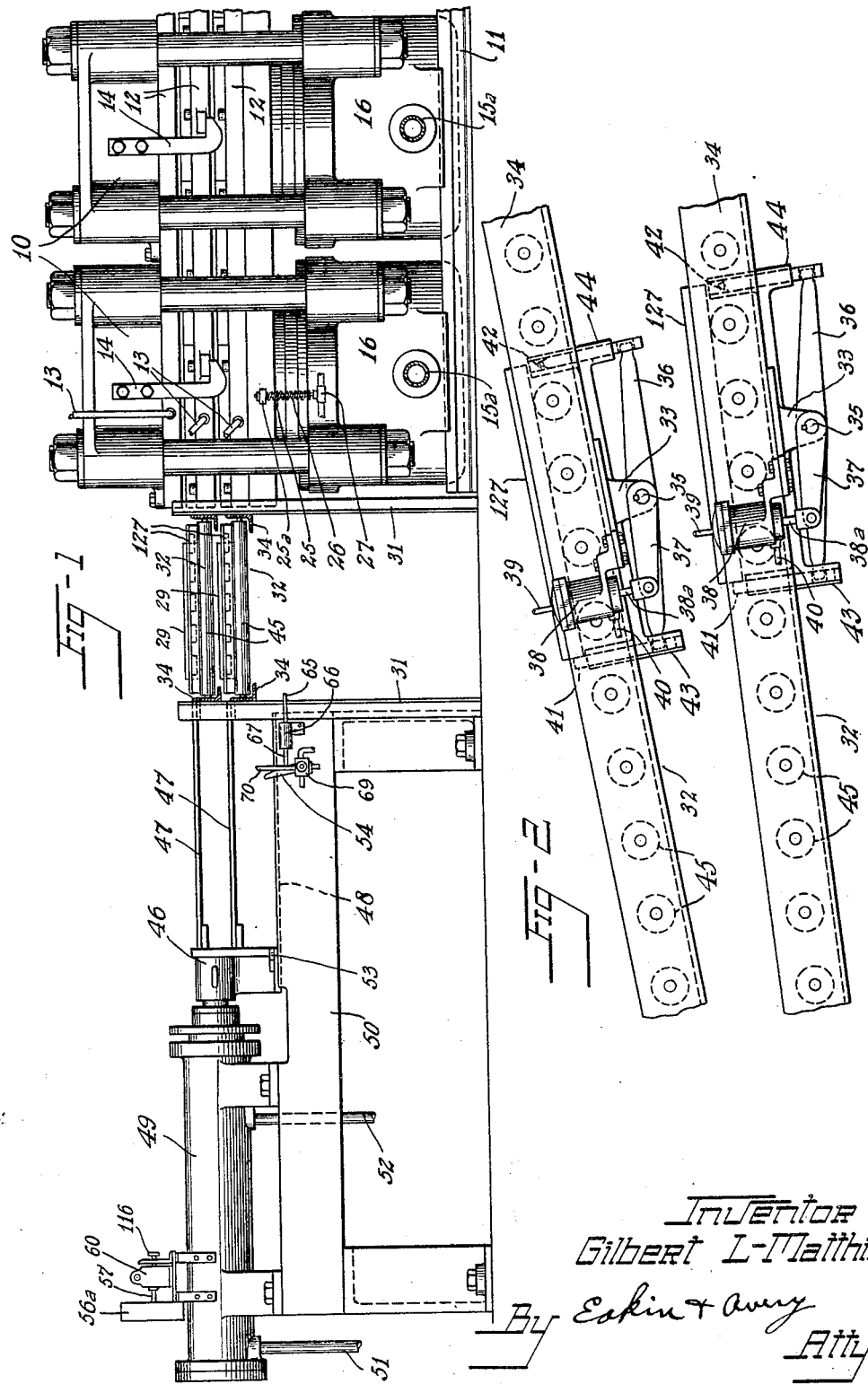
Inventor
Gilbert L. Matthias
By Eakin + Avery
Attys.

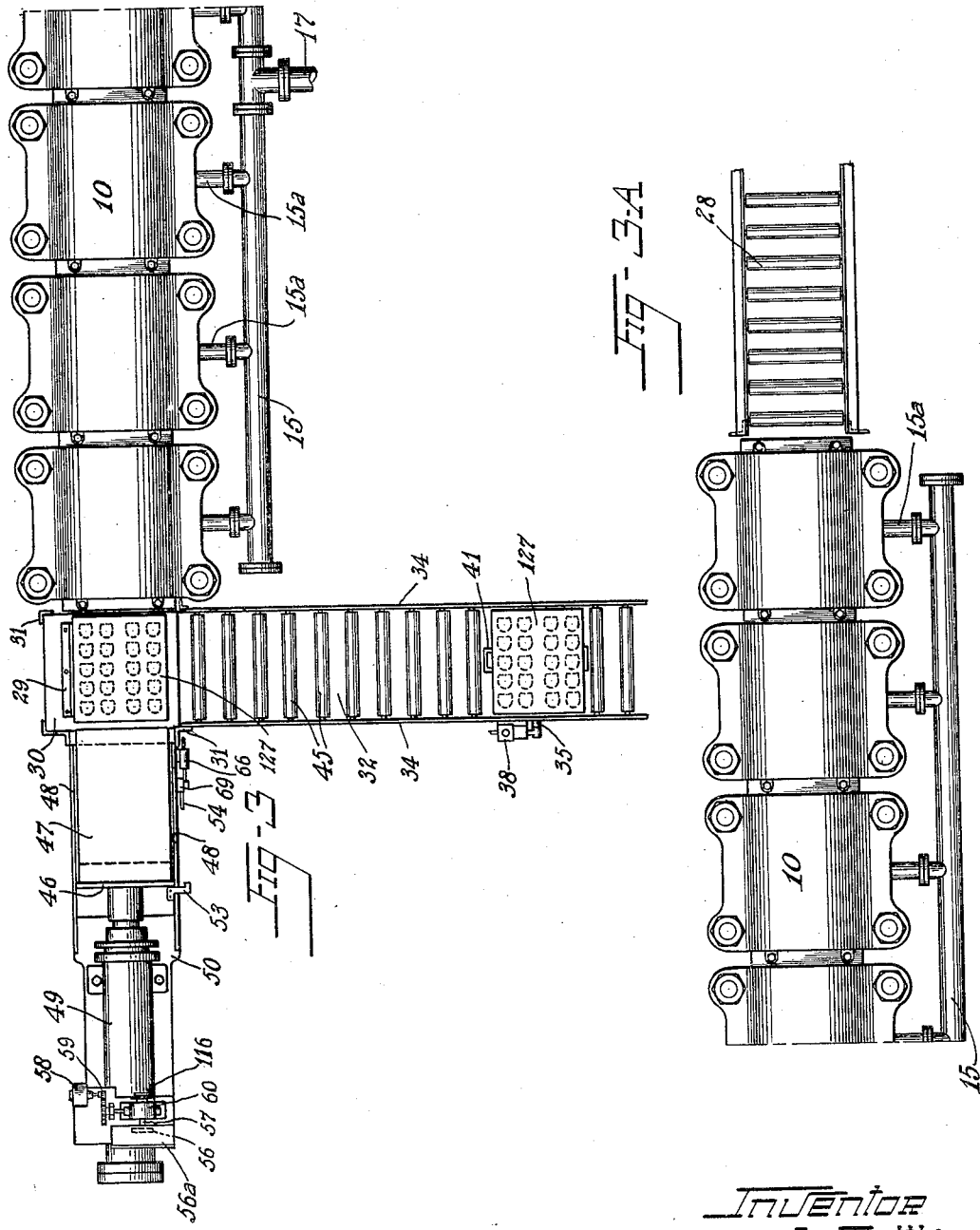

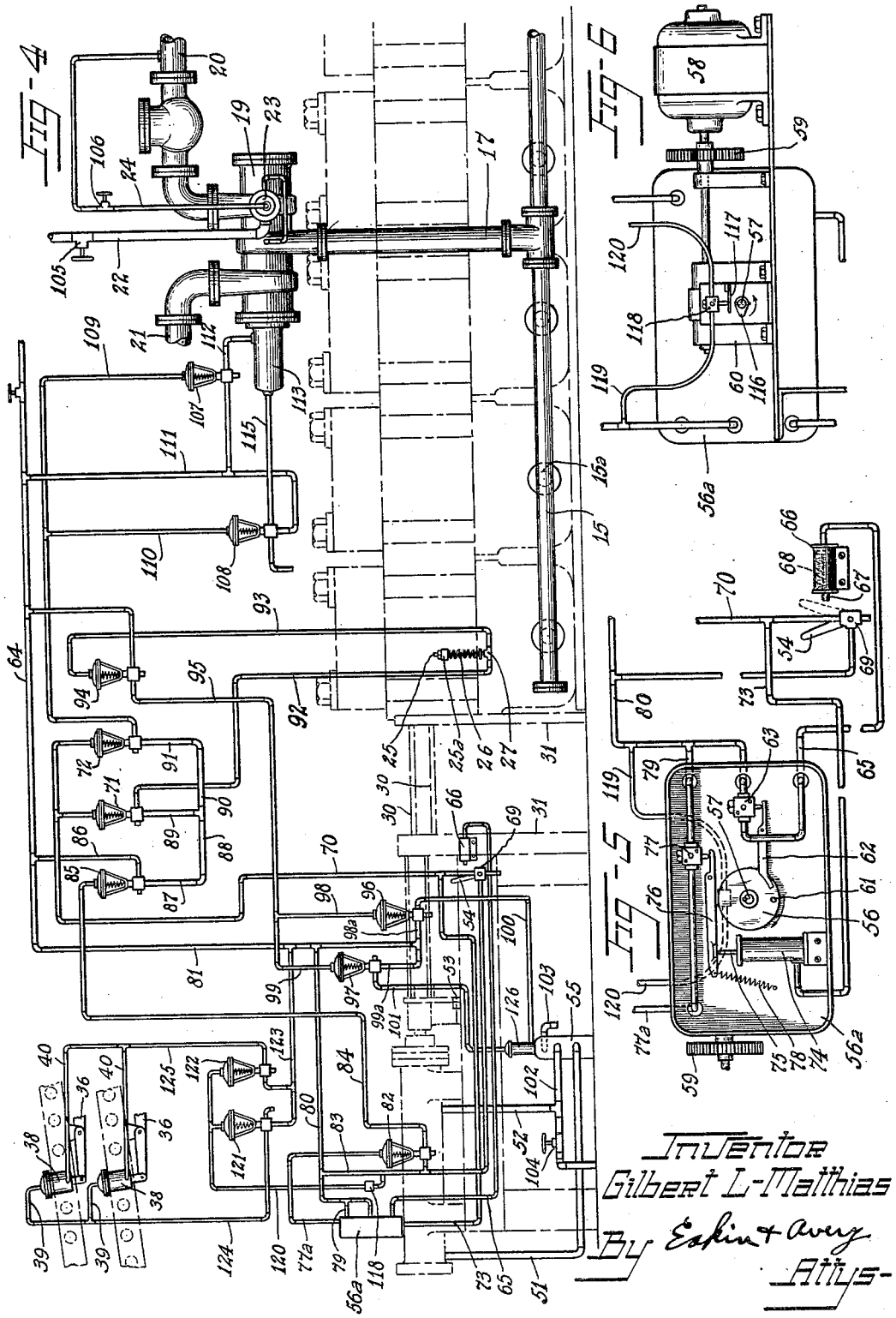

Patented Apr. 25, 1933

1,905,929

UNITED STATES PATENT OFFICE

GILBERT L. MATTHIAS, OF CUYAHOGA FALLS, OHIO, ASSIGNOR TO THE B. F. GOODRICH COMPANY, OF NEW YORK, N. Y., A CORPORATION OF NEW YORK

VULCANIZING APPARATUS

Application filed August 24, 1928. Serial No. 301,797.

This invention relates to methods and apparatus for vulcanizing articles in molds by passing a procession of the molds through a mold-heating device.

My chief objects are to provide in an improved manner for passing molds in succession into the heating device at one position and out of it at another so that each mold is subjected to heat for the same period of time and the heating device is kept in substantially continuous service and so that, if desired, the molds may be conveniently put, in succession, through a repeated cycle of operations including the filling of the molds, the vulcanizing of the articles therein and the removal of the vulcanized articles therefrom. Further objects are to provide conveniently for strong closing pressure upon the molds in the heating device; to provide for periodic releasing of the mold-closing pressure during the period of vulcanization, which has been found to be desirable for a well compacted and sharply molded product; and to provide automatic apparatus for timed manipulation of the molds in the vulcanizing operation. Other objects are to provide advantages such as economy and regularity in the handling of unattached mold sections and to provide for the employment of unattached mold sections in a processional vulcanizing system so that the mold sections may be conveniently handled for other operations such as the filling, emptying, cleaning and coating of the molds, and, in the case of rubber-heel molds, for example, the mounting of the nail-anchoring washers upon the washer-supporting pins of the molds.

I attain these several objects very simply by employing an elongated platen press having heated platens for heating the molds, shoving a succession of molds forward in the press at timed intervals, a mold being added to and one removed from the series of molds in the press at each movement of the molds and the press preferably being relieved of pressure for each movement of the molds.

Of the accompanying drawings:

Fig. 1 is a side elevation of apparatus embodying and adapted to carry out my invention in its preferred form, parts being broken away.

Fig. 2 is a fragmentary side elevation of conveyor devices for controlled feed of the molds to the mold-inserting device.

Figs. 3 and 3A together constitute a plan view of portions of the apparatus.

Fig. 4 is a side elevation of the apparatus showing the control or timing system diagrammatically in full lines and other parts of the apparatus in broken lines.

Figs. 5 and 6 are elevations of mechanism for controlling the pressure-operated valve of the timing system.

Referring to the drawings, 10 designates an elongated vulcanizer of the platen type supported in the usual manner upon a base 11 and comprising a plurality of steam platens 12, 12 having respective steam lines 13, 13 leading thereto. Hook members 14, 14 are mounted at intervals longitudinally of the vulcanizer for limiting the downward movement of the intermediate platen 12 when the vulcanizer is open, so as to space apart the adjacent platens. The vulcanizer also comprises hydraulic means for pressing together the platens thereof, the said means including a horizontal header pipe 15 connected through the branch pipes 15ª to the respective press ram cylinders 16, 16 of the vulcanizer. A header 17 connects the horizontal pipe 15 with a fluid-pressure operated valve 19 the latter being adapted to permit the header to be alternately connected with an inlet pipe 20 leading to a source of water under relatively low pressure and with a water outlet pipe 21. The inlet end of valve 19 also has connected therewith a valved pipe 22 connected to a source of water under relatively high pressure. A high-low pressure valve 23 is connected with valve 19, with a pipe 24 leading to pipe 20, and with the pipe 22. The arrangement is such that upon opening the valve to permit flow of water through pipe 20, the platens are closed under the relatively low hydraulic pressure, and immediately thereafter the platens and molds are subjected to relatively high pressure applied through pipe 22.

One of the presses of the vulcanizing apparatus has a stem 25 slidably mounted in a lug 25$^a$ on the side of the ram head and yieldingly held against vertical movement upward by a compression spring 26 or the like. The stem 25 is adapted to be carried by the ram head upon which it is mounted and at the lowest point in its path to press against the stem of a needle valve 27 to open the latter.

A conveyor 28 is arranged at the delivery end of the vulcanizer to receive the molds forced therefrom in the course of the operation of the apparatus, and to convey the molds to any desired location.

For supporting a plurality of molds in a convenient position at one end of the elongated vulcanizer preparatory to their being introduced between the platens of the same, I provide a plurality of mold-supporting plates 30, 30, carried upon upright frame members 31, 31 and arranged in tiers in proximity to the mold-receiving end of the vulcanizer. A plurality of inclined gravity conveyors 32, 32, extend laterally of the mold-supporting plates 30, 30, and are adapted to feed molds onto the respective plates 30, 30, adjacent plates being fed by conveyors positioned one above the other as shown, or at opposite sides of the mold-supporting structure. A flanged stop member 29 is arranged along one side margin of each of the mold-supporting plates 30, 30, to act as a stop for the molds being fed laterally onto the plates from the conveyors 32.

A mechanism is provided for delivering one mold at a time at determinate timed intervals to each of the mold-supporting plates 30, 30, and for preventing the delivery of more than one mold at a time to any plate 30, such mechanism comprising a pair of journal brackets 33, 33, respectively secured to the lower faces of the two side members 34, 34, of each of the inclined conveyors 32, 32. Each pair of journal brackets supports a transverse rock shaft 35 having secured thereto midway of the conveyor side members 34, 34, the middle portion of an elongated rocker arm 36 adapted for movement in a vertical plane longitudinally of a conveyor 32.

Each rock shaft 35 has a lever arm 37 rigidly secured thereon at one end. The free end of the arm 37 is connected by a clevis or the like to the piston rod 38$^a$ of a fluid-pressure cylinder 38. Each cylinder 38 is rigidly supported on one of the conveyor side members 34, and has fluid inlet and outlet pipes 39 and 40 connected therewith at opposite ends thereof. Vertically-movable stop plates 41 and 42 are operatively connected with the respective ends of each rocker arm 36 and the plates are adapted to slide vertically in respective guideways 43, 44, and in their raised positions are adapted to extend upward between two adjacent rollers 45 of the inclined conveyor and into the path of a mold moving along the conveyor. The arrangement on each conveyor is such that when one of the stop plates is in raised position, the other one is in lowered position even with or below the level of the upper surface of the rollers 45.

Mechanism for pushing or impelling a mold or a plurality thereof from the mold-supporting plates 30, 30, between the platens of the open vulcanizer comprises a pusher head 46 carrying a plurality of pusher plates 47 and adapted to be reciprocated on suitable slideways 48, 48 formed upon a supporting frame 50 by means of power applied through a fluid-pressure operated cylinder 49 mounted on the said supporting frame. Fluid pressure applied through an inlet pipe 51 produces forward movement of the pusher head 46 whereby the pusher plates 47 move the respective molds into corresponding openings between adjacent platens of the open vulcanizer. Fluid pressure subsequently applied through pipe 52 reverses the movement of the pusher head and pusher plates 47, moving them to the left as viewed in Fig. 1. The pusher head 46 carries a tripping finger 53 at its forward end, the said finger being arranged to extend laterally outward from the head and being adapted to trip a valve lever 54 mounted on the frame 50 at the end of the forward stroke of the pusher head, for operating a valve 69. A fluid-pressure operated valve 55 provides means for reversing the direction of the reciprocating pusher 46.

The mechanism for operating the various elements in a definite sequence at determinate timed intervals is mounted rigidly on cylinder 49 and comprises a metal disc 56 suitably housed in a box 56$^a$ and mounted on a shaft 57 the latter of which is rotated at a constant speed by motor 58 through suitable reduction gears 59 and 60. The disc 56 has a pin 61 mounted thereon near its periphery and arranged at one point of its orbit to bear for a short interval against one end of a lever 62 pivotally mounted on the box 56$^a$ to depress that end of the lever and to raise the opposite end thereof into contact with the valve stem of a needle valve 63 and to open the latter.

Valve 63 is connected at one side to a main fluid-pressure supply pipe 64. At its other end it is connected by pipe 65 to a cylinder 66, the piston 67 of which is adapted to be so moved by fluid pressure as to overcome the force of a compression spring 68 whereby to actuate the lever arm 54 of valve 69 to close the latter. The valve 69 is connected at one side thereof to the main fluid-pressure supply pipe 64 and at its other side to a pipe 70 leading to the valve-seating mechanism of two fluid-pressure operated valves 71 and 72. A branch pipe 73 leads from pipe 70 to the lower end of a vertically-arranged cylinder 74 supported within the box 56ᵃ, the said cylinder 74 having its fluid-pressure operated piston-rod 75 positioned below and in the vertical path of movement of one end of a lever 76, the latter being centrally fulcrumed on the box 56ᵃ. The opposite end of the lever 76 is positioned below the stem of a needle valve 77 and is normally forced against the latter to open it by action of a spring 78.

The said spring 78 has its respective ends secured to the end of the lever 76 adjacent the point of contact of the piston-rod therewith and to the box 56ᵃ, and the spring is arranged to exert a constant force downward on this end of the lever whereby to force the other end into active engagement with the stem of valve 77 to keep that valve open. The arrangement is such that when the piston-rod 75 is moved to its raised position it lifts the end of the lever 76, overcoming the resistance of spring 78 and closes the needle valve 77. One side of valve 77 is connected to the main-pressure supply pipe 64 through pipes 79, 80, and 81. The other side of valve 77 is connected through pipe 77ᵃ to the valve-seating mechanism of a pressure-operated valve 82. The valve 82 is connected at one side thereof through pipes 83, 80, 81, to the main-fluid pressure pipe 64, and at the other side through pipe 84 to the valve-seating mechanism of a fluid-pressure operated valve 85. The valve 85 is connected at one side thereof through pipe 86 to the main-fluid pressure pipe 64 and at its other side to a side of each of the valves 71 and 72 through the pipes 87 to 91 inclusive. Valve 71 has its other side connected to one side of the needle valve 27 through pipe 92, the outlet pipe 93 from the latter being connected to the valve-seating mechanism of a pressure-operated valve 94. The valve 94 is positioned in the line 95 connecting the main-pressure pipe 64 with the valve-seating mechanism of each of a pair of fluid-operated valves 96 and 97, through respective pipes 98 and 99.

Valves 96 and 97 are connected at one side thereof to the main fluid-pressure pipe 64 by pipe 81 and the respective pipes 98ᵃ, 99ᵃ. The valves 96 and 97 are respectively connected at their other sides to opposite ends of the valve-operating mechanism 126 of valve 55 through the respective pipes 100, 101. The valve 55 is connected by pipe 102 with a source of fluid under pressure, and is connected at 103 with a fluid discharge pipe.

Hand-operated valves 104, 105, 106 are conveniently provided in the water pressure lines 102, 22 and 24 leading to the valve-operating mechanism.

For controlling the operation of the valve 19, a pair of valves 107, 108, are provided, each having its valve-operating mechanism connected to the valve 72, the former through pipe 109 and the latter through pipe 110. Valve 107 connects the main-pressure pipe 64 through pipes 111, 112 with one end of the valve-operating mechanism 113 of valve 19; and valve 108 connects the main-pressure pipe 64 through pipes 111, 115, with the opposite end of the said valve-operating mechanism 113.

For the purpose of permitting the delivery of but one mold at a time at determinate timed intervals from each of the conveyors 32, 32 to the respective plates 30, 30, I provide a cam member 116 secured on shaft 57 for rotation in the direction of the arrow in Fig. 6 and adapted during a portion of its period of rotation to press upward against a spring member 117 whereby to raise the stem of a normally closed needle valve 118 to open the said valve. The valve 118 is connected at one side to the main-pressure pipe 64 through pipe 119 and at the other side is connected by pipe 120 to the valve-seating mechanism of each of two fluid-pressure operated valves 121 and 122. One side of each of the valves 121 and 122 is connected with the main-pressure pipe 64 through pipes 123 and 81. The other side of the valve 121 is connected by pipe 124 to the upper end of each of the fluid-pressure cylinders 38, 38 through the pipes 39, 39; and the other side of valve 122 is connected by pipe 125 to the lower end of each of the fluid-pressure cylinders 38, 38 through the pipes 40, 40.

The several molds shown in the drawings, are, for purposes of illustration, shown as rubber heel molds and are designated 127.

All of the fluid pressure-operated valves are of standard construction, both the valve-operating mechanism and the main valve structure being adapted to be alternatively connected with a source of fluid under pressure and with a pressure-release pipe.

At the beginning of a cycle of operations in the use of my apparatus, all of the press rams are under pressure in their upper positions and the steam platens are together. The pusher head 46 is in its retracted position out of contact with the mold-supporting plates 30, 30; and molds are positioned upon the latter while other molds are being held on the separate inclined conveyors at points respectively adjacent the several mold-supporting plates by means of the stop-plates 41, the latter being in the position shown in Fig. 2.

The valve lever 54 is in the position shown in dotted lines in Fig. 5.

The arrangement is such that as the timing disc 56 rotates in the direction of the arrow in Fig. 5, the pin 61 trips the lever 62, and valve 63 is opened so as to admit air under pressure to cylinder 66. Piston 67 thereupon moves valve lever 54 to the position shown in full lines in Fig. 5 whereby fluid under pressure flows into pipes 70 and 73 from pipe 64. Fluid pressure is thus exerted on the valve-actuating mechanism of valves 71 and 72 through pipe 70 whereby these valves are opened.

Piston 75 of cylinder 74 is raised by fluid under pressure flowing into it from pipe 73 whereby valve 77 is closed which operates the mechanism of valve 82 to allow flow of fluid under pressure to the actuating mechanism of valve 85 from the main-pressure pipe 64. Valve 85 is thereby opened to permit a flow of fluid under pressure from the main-pressure pipe 64 into line 92 through pipes 87, 88, 89 and valve 71. It also allows fluid under pressure to flow into pipes 109 and 110 through pipes 87, 88, 90, 91 and valve 72. The pressure in the valve-actuating mechanism of valve 108 opens the latter to allow fluid under pressure to flow from the main-pressure pipe 64 into the valve-operating mechanism 113 of valve 19. Pressure on the valve-operating mechanism of valve 107 cuts off the main-pressure pipe 64 from the valve-operating mechanism 113 and permits release of pressure from one end thereof through pipe 112 and the bottom of the valve 107. The valve 19 is thereby actuated to connect the header 17 with the outlet pipe 21, thus releasing pressure on the press rams and permitting them to move downward, opening the platens.

As the ram head carrying the spring-pressed stem 25 reaches a low position it contacts with the needle valve 27 and opens the latter, permitting fluid under pressure to flow through pipe 93 to the valve-actuating mechanism of valve 94. This valve is thus opened to permit flow therethrough of fluid under pressure from the main pipe 64 to each of the valves 96, 97, controlling operation of the pusher head 46. Fluid pressure on the diaphragm of valve 96 opens this valve allowing the flow of fluid under pressure from the main-pressure supply pipe 64 into the lower end of cylinder 126 through pipe 100.

Valve 55 is thereby operated to actuate cylinder 49 and thereby to cause movement of the pusher head 46 toward the mold-supporting plates 30, 30, whereby the pusher plates 47 engage the molds 127 thereon and push them into the vulcanizer between the adjacent platens. As the pusher head nears the end of its forward stroke or movement the finger 53 carried by the head contacts with the valve lever 54 and moves the latter to the position shown in dotted lines in Fig. 5, thus releasing the pressure in pipe 70 and 73 and that on the valve 71 and 72. The piston 75 then moves downward permitting spring 78 to actuate lever 76 to open valve 77 and permit fluid under pressure to flow to the valve-operating mechanism of valve 82 through pipe 77ª. This closes valve 82 and releases the fluid pressure in pipe 84 whereby valve 85 is closed under action of its spring, and the pressure in pipes 87 to 91 is released. At the same time the valves 71 and 72 are closed by their respective springs and the fluid pressure released from pipes 92, 93, 109 and 110. The spring mechanism of valve 107 then opens the latter whereby fluid under pressure flows from the main-pressure pipe 64 into pipe 112 and into the end of the valve-actuating mechanism 113. At the same time valve 108 is actuated to shut off the flow of fluid under pressure from line 111, and to release the fluid pressure in pipe 115. The valve 113 thereby is actuated to cut off the outflow of water through pipe 21 and to connect the header 17 with the inlet pipe 20. Fluid under pressure flows from pipe 20 into the header 17. The press rams thereupon move upward to close the platens under the force of hydraulic pressure applied thereto through header 17 and pipes 15 and 15ª. When the platens are closed and under the relatively low pressure of the fluid applied through pipe 20, the pressure equalizing valve 23 functions to permit fluid under relatively high pressure to flow into header 17 from pipe 22 to place the steam platens of the presses under their relatively high operating pressure.

The raising of the platen carrying the lug 25ª and stem 25 under action of the hydraulic ram releases the pressure of the stem 25 upon needle valve 27 whereupon the latter is closed under the action of spring 26.

While the valves 107 and 108 are thus being actuated to close the press platens, the valve 94 is closed by action of its spring, following the release of fluid pressure from its valve-operating mechanism. The closing of valve 94 releases the fluid pressure in pipe 95 and causes valve 96 to close and valve 97 to open whereby fluid under pressure is applied to the end of the hydraulic valve-actuating cylinder 126 through pipe 101, the pressure in pipe 100 being simultaneously released. Valve 55 thereupon is actuated to cause the pusher head 46 to move to its original retracted position and away from the mold-supporting plates 30, 30.

The rotary cam 116 is so arranged on shaft 57 and so timed with respect to the pusher-operating mechanism that after the pusher head 46 is retracted out of contact with the mold-supporting plates 30, 30, and prior to the time when the pin 61 on the rotating disc 56 again moves into position to trip the lever 62, the cam 116 raises the stem of needle valve 118 permitting fluid under pressure to flow from the main pressure-supply pipe 64 through pipe 120 into the valve-operating mechanism of each of the valves 121 and 122. Valve 121 is actuated to permit the flow of fluid under pressure therethrough from the main-pressure pipe 64 into pipe 124 and into the upper part of each cylinder 38. At the same time valve 122 is closed and any pressure in pipe 125 and the lower part of the cylinders 38 is released. The rocker arms 36 are thus moved to depress the stop plates 41 and to permit molds 127 held thereby to move by gravity onto the respective mold-supporting plates 30, 30, ready to be shoved into the vulcanizer by the pusher plates 47 at the proper time during the next cycle of operations. Stop plates 42 are raised as the stop plates 41 are lowered, so as to prevent more than one mold moving onto the supporting plates 30, 30, at any one cycle.

As the cam 116 rotates further it releases the needle valve 118, the latter then closing to shut off fluid pressure from the pipe 120. Valves 121 and 122 thereupon are respectively moved by the action of their spring mechanisms to closed and open position, thus releasing pressure in pipe 124 and causing fluid under pressure to flow into pipe 125 from the main-pressure pipe 64 through pipe 123. The rocker arm 36 on each conveyor is thus moved to raise the stop plate 41 and to depress the stop plate 42 whereupon another mold moves into contact with the stop plate 41, ready for release at the proper time during the next cycle of operations, and for gravity movement onto a mold-supporting plate 30.

It is also within the scope of this invention to control the cycle of operations of a plurality of elongated vulcanizers by means of a single valve control mechanism.

My apparatus can be modified to permit the operation of a plurality of laterally-positioned pusher plates by one fluid pressure cylinder, and to permit other means to be substituted for the fluid-pressure-operated valves and motor driven disc for actuating the various elements of the apparatus at determinate timed intervals.

By the use of my method and apparatus I am able to effect the various objects of my invention, and to secure a superior, uniformly vulcanized product at a substantial saving in labor cost, while using apparatus relatively simple in construction and easy of operation.

My invention may be modified within the scope of the appended claims.

I claim:

1. Apparatus for moving a mold between the platens of a vulcanizer from a point remote therefrom, the said apparatus comprising a support for a mold adjacent the platens of a vulcanizer of the platen type, mechanism for presenting a mold on the said support, and means operative in timed relationship with the said mold-presenting mechanism for feeding the mold between the platens of a vulcanizer.

2. Apparatus as defined in claim 1 including valve means associated with the mold-feeding means and with the mold-presenting mechanism and so arranged that the said feeding means is operative only when the mold-presenting mechanism is inoperative.

In witness whereof I have hereunto set my hand this 9th day of August, 1928.

GILBERT L. MATTHIAS.